United States Patent
Xu et al.

(10) Patent No.: US 7,065,652 B1
(45) Date of Patent: Jun. 20, 2006

(54) SYSTEM FOR OBFUSCATING COMPUTER CODE UPON DISASSEMBLY

(75) Inventors: Bin Xu, Sunnyvale, CA (US); Jim Sesma, White City, OR (US); Robert Freeman, Orange County, CA (US); Weijun Li, Sunnyvale, CA (US)

(73) Assignee: Aladdin Knowledge Systems, Ltd., Tel Aviv (IL)

( * ) Notice: Subject to any disclaimer, the term of this patent is extended or adjusted under 35 U.S.C. 154(b) by 844 days.

(21) Appl. No.: 09/603,575

(22) Filed: Jun. 21, 2000

(51) Int. Cl.
*H01L 9/32* (2006.01)

(52) U.S. Cl. ..................... 713/190; 726/33

(58) Field of Classification Search ........... 713/200, 713/201, 176, 190; 712/233; 726/33
See application file for complete search history.

(56) References Cited

U.S. PATENT DOCUMENTS

| | | | |
|---|---|---|---|
| 5,748,741 A * | 5/1998 | Johnson et al. | 380/28 |
| 6,205,550 B1 * | 3/2001 | Nardone et al. | 713/200 |
| 6,594,761 B1 * | 7/2003 | Chow et al. | 713/190 |
| 6,643,775 B1 * | 11/2003 | Granger et al. | 713/190 |
| 6,665,796 B1 * | 12/2003 | Folmsbee | 713/190 |
| 6,668,325 B1 * | 12/2003 | Collberg et al. | 713/194 |

FOREIGN PATENT DOCUMENTS

| | | |
|---|---|---|
| WO | PCT/WO 97/04394 | 2/1997 |
| WO | PCT/WO 99/01815 | 1/1999 |

OTHER PUBLICATIONS

Operating System Concepts, 5th edition, Silberschatz et al. Wiley & Sons, Figure 12.3 and pp. 402-404.*
"Programmer's Guide to the IBM PC", Peter Nortion, 1985, Microsoft Press, pp. 303, 49, Figure 3-1.*
Turbo Assembler, Version 2.5, Borland International, 1988, 1991, p. 292.*
Cohen, F.B., "Operating System Protection Through Program Evolution," Computers & Security, Elsevier Science Publishers, Amsterdam, NL, vol. 12, No. 6, Oct. 1, 1993, pp. 565-584.

(Continued)

*Primary Examiner*—Gregory Morse
*Assistant Examiner*—Thomas Ho
(74) *Attorney, Agent, or Firm*—Townsend and Townsend and Crew LLP

(57) ABSTRACT

A system for preventing accurate disassembly of computer code. Such code masking, referred to as "obfuscation," is useful to prevent unwanted parties from making copies of an original author's software, obtaining valuable information from the software for purposes of breaking into a program, stealing secrets, making derivative works, etc. The present invention uses assembly-language instructions so as to confuse the disassembler to produce results that are not an accurate representation of the original assembly code. In one embodiment, a method is provided where an interrupt, or software exception instruction, is used to mask several subsequent instructions. The instruction used can be any instruction that causes the disassembler to assume that one or more subsequent words, or bytes, are associated with the instruction. The method, instead, jumps directly to the bytes assumed associated with the instruction and executes those bytes for a different purpose. A preferred embodiment works with a popular Microsoft "ASM" assembler language and "DASM" disassembler. The instructions used to achieve the obfuscation include "INT" instructions. Using this approach up to 17 bytes of obfuscation can be achieved with five instructions. Each instruction remains obfuscated until executed and returns to an obfuscated state afterwards.

1 Claim, 2 Drawing Sheets

OTHER PUBLICATIONS

Mambo, M., et al., "A Tentative Approach to Constructing Tamper-Resistant Software," School of Information Science, Japan Advanced Institute of Science and Technology, Sep. 23, 1997, pp. 23-33.

Bentson, R., "Re: "Hiding" variables in C," Messages from Newsgroups: Comp. Lang. C., Comp. OS. MSDOS.Programmer, Sci.Crypt., Online! Mar. 6, 1992.

Hoffman, J., "Re: "Hiding" variables in C," Messages from Newsgroups: Comp. Lang. C., Comp. OS. MSDOS.Programmer, Sci.Crypt., Online! Mar. 4, 1992.

* cited by examiner

US 7,065,652 B1

SYSTEM FOR OBFUSCATING COMPUTER CODE UPON DISASSEMBLY

COPYRIGHT NOTICE

A portion of the disclosure recited in the specification contains material which is subject to copyright protection. Specifically, source code instructions are included for a process by which the present invention is practiced in a computer system. The copyright owner has no objection to the facsimile reproduction of the specification as filed in the Patent and Trademark Office. Otherwise all copyright rights are reserved.

BACKGROUND OF THE INVENTION

This invention relates in general to computer software and more specifically to a system for preventing accurate disassembly of computer programs.

Computer software manufacturers have a keen interest in protecting their software. Software can be easily copied, in whole or in part, by making digital copies. Other forms of the copying do not require a competitor to copy the actual digital data, but are based on a knowledgeable programmer viewing the instructions within the software to gain information that can allow the programmer to "break" security systems, obtain valuable programming techniques or trade secrets of the software manufacturer, make derivations, manipulate the operation of the original code, etc.

One barrier to copying computer software is that many forms of software are distributed in a format that is not easily decipherable, or readable, by a human.

FIG. 1B is an illustration of various forms in the prior art which a computer program, or software, is transformed into during the process of creation, distribution, and ultimate execution of the software on a user's machine.

In FIG. 1B, human readable source code 10 is developed by a programmer who is the original author, and owner, of the work. Such source code is easily readable and understandable by a human programmer since the source code is written in text that resembles plain English with mathematical and logical equations. Many different forms of source code exist today based on many different types of computer languages. "Assembly code" is a form of human-readable code that is closely tied to a specific microprocessor's instruction set. Assembly code has many similarities to source code in terms of the form translations that the assembly code undergoes prior to being executed. For purposes of this specification, source code and assembly code can be treated similarly, and terminology and concepts associated with source code and assembly code can be interchanged. For example, as discussed below, compilation and assembly are analogous, as are decompilation and disassembly.

Returning to FIG. 1B, source code 10 is compiled by compiler 12. Compiler 12 is a software process that translates human-readable source code to a series of numbers which is, for the most part, unreadable by humans. Source code 10 is thus transformed, or "compiled," by compiler 12 to form the human-unreadable object code. Object code 14 can be linked by linker 20 with other object code modules as illustrated by object code modules 16 and 18 in FIG. 1B. Once the object code modules are linked by linker 20, they form executable program 22. Executable program 22 can be loaded by loader 24 into a user's computer to form executing image 26. Executing image 26 represents the actual numerical information that is executed by a microprocessor within an end-user's computer.

Note that all forms of source code 10 that exists after compilation by compiler 12 are, for the most part, unreadable by a human. In other words, object code modules 14, 16 and 18; executable program 22; and executing image 26 are basically unformatted conglomerations of numbers that are extremely difficult to understand.

However, tools exist to decompile, or disassemble, these unreadable versions of source code. Decompiler 28 can accept the unformatted numbers of object code 14, executable program 22 or executing image 26 and produce a readable version of the original source code program. Such a readable version is referred to as decompiled (or disassembled) code 30. While the decompiled code is usually not as readable as original source code 10, it is a very effective tool for allowing an experienced programmer to understand the operation of the computer program and greatly reduces the amount of time required to copy, hack, or otherwise manipulate source code produced by an original programmer.

Thus, it is desirable to produce an invention which prevents, or reduces the effectiveness of decompilation, or disassembly, of compiled or assembled code.

SUMMARY OF THE INVENTION

The present invention prevents disassembly of computer code. Such prevention includes hiding, masking, or otherwise "obfuscating," the original code. This helps thwart unwanted parties from making copies of an original author's software, obtaining valuable information from the software for purposes of breaking into the program, stealing secrets, making derivative works, etc. The present invention uses special assembly-language instructions to confuse the disassembler to produce results that are not an accurate representation of the original assembly code. In one embodiment, a method is provided where an interrupt (typically a software interrupt) is used to mask some of the subsequent instructions. The instruction used can be any instruction that causes the disassembler to assume that one or more words subsequent to the instruction, are associated with the instruction. The method, instead, jumps directly to the bytes assumed associated with the instruction and executes those bytes to achieve the original functionality of the program.

A preferred embodiment works with a popular Microsoft "ASM" assembler language and "DASM" disassembler. The instructions used to achieve the obfuscation include software interrupt, "INT," instructions. Using this approach, up to 17 bytes of obfuscation can be achieved with five instructions. Each instruction remains obfuscated until executed and returns to an obfuscated state afterwards.

In one embodiment, the invention provides a method for obfuscating computer program instructions upon disassembly, the method comprising inserting an obfuscating instruction or causing a disassembler to not disassemble one or more bytes subsequent to the obfuscating instruction; and inserting a branch instruction to invoke execution of the one or more bytes subsequent to the obfuscating instruction.

DETAILED DESCRIPTION OF THE PREFERRED EMBODIMENT

Figure 1A:
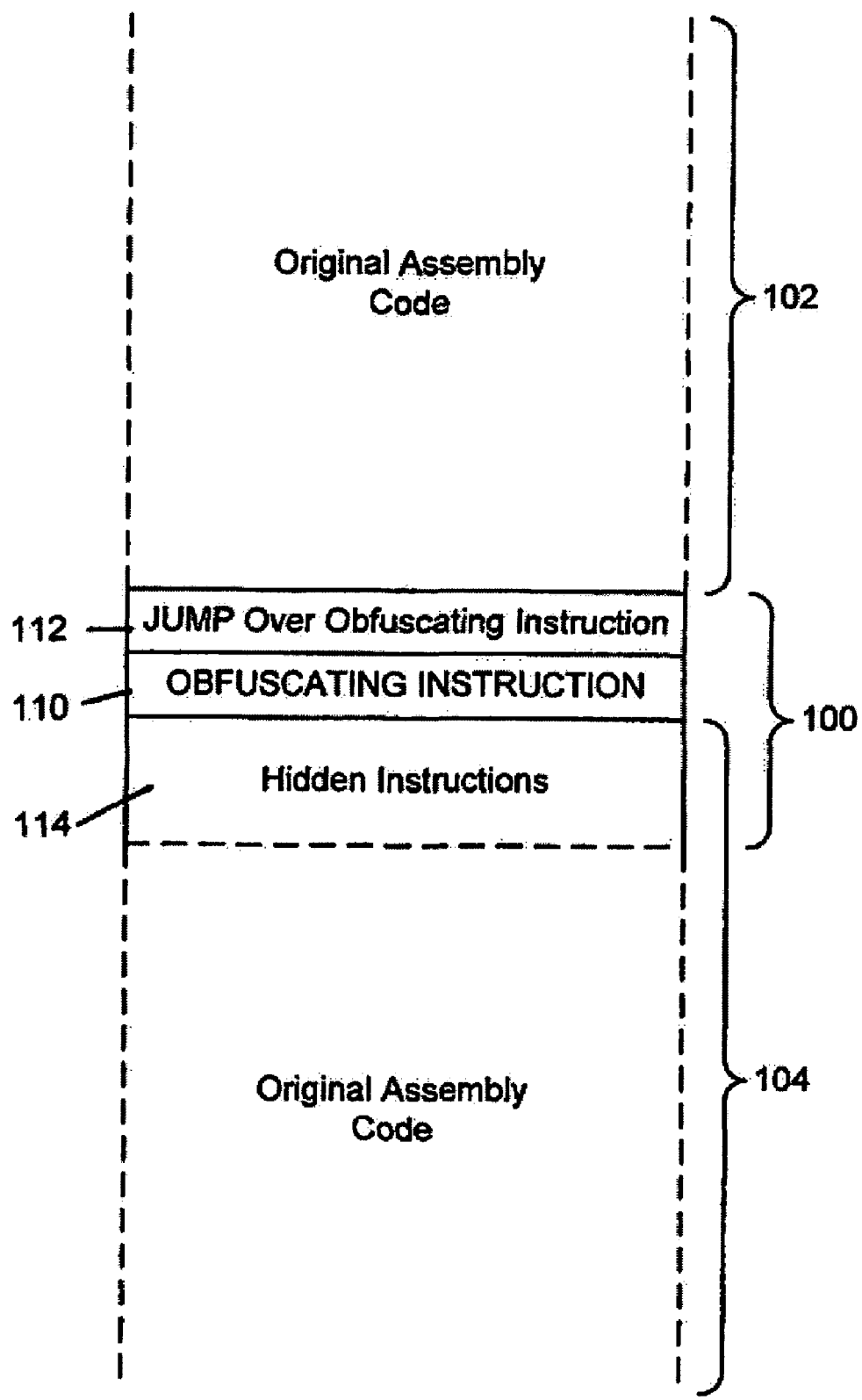
FIG. 1A illustrates software instructions of the present invention.
Figure 1B:
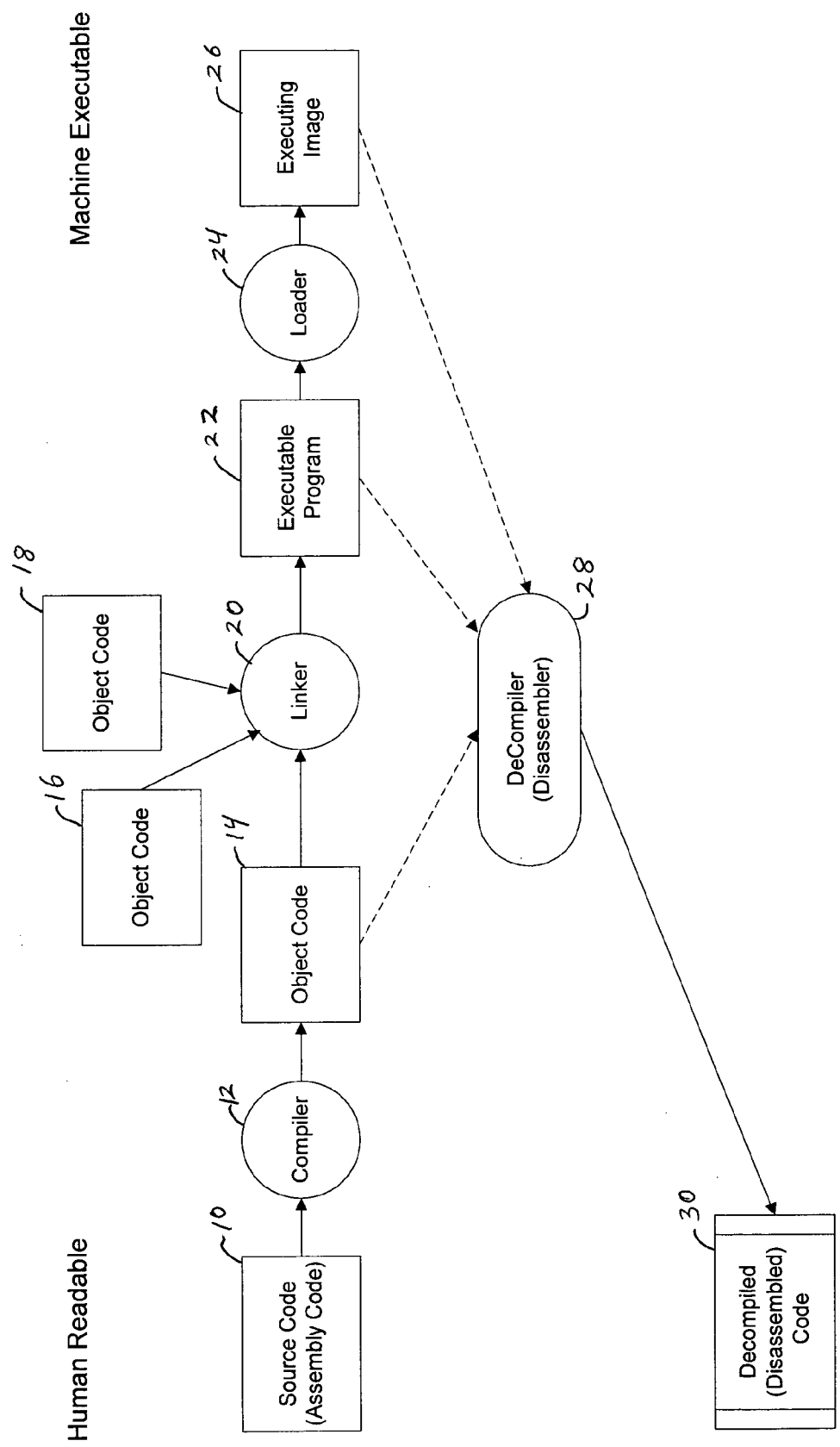
FIG. 1B is an illustration of various forms in the prior art into which a computer program, or software, is transformed during the process of creation, distribution, and ultimate execution of the software on a user's machine.

FIG. 1A illustrates software instructions of the present invention.

In FIG. 1A, instructions at 100 illustrate the concept of code obfuscation. Such instructions are included within the body of an assembly language program. A larger portion of the program is illustrated by preceding assembly code 102 and succeeding assembly code 104. Note that the obfuscating instruction, and associated instructions, can be inserted more than once within the program.

The obfuscating instruction, and associated instructions, include obfuscating instruction 110, jump instruction 112 and hidden code 114. During execution of the assembly code, the assembly program operates as intended by the original programmer until jump instruction 112 is executed. When jump instruction 112 is executed then obfuscating instruction 110 is skipped and execution proceeds at hidden instructions 114. In other words, obfuscating instruction 110 is never executed. Hidden instructions 114 are part of the instructions written by the original programmer and, thus, are part of the original program. Only jump instruction 112 and obfuscating instruction 110 need to be inserted into the original program.

It should be apparent that the program will operate as originally intended with the exception that a few more cycles of processor time are required in order to perform the jump instruction 112. Also, a few more bytes of information are stored in the program every time the technique of the present invention is used to account for jump instruction 112 and obfuscating instruction (or instructions, as described below). The number of hidden instructions at 114 varies with the specific obfuscating instruction, or instructions, employed, as is discussed in detail, below.

Note that jump instruction 112 need not be immediately adjacent to obfuscating instruction 110. Any instruction that directs a processor to obtain the next instruction from within the "hidden" instructions 114 can be sufficient. Also, although the invention is discussed with respect to hidden instructions 114 being immediately adjacent to obfuscating instruction 110, it is possible that obfuscating instructions may act to hide non-adjacent instructions.

The present invention is described with respect to assembly language code in "ASM" format. Such format is produced, for example, by the Microsoft VC++ compiler. It should be apparent that the techniques of the present invention can be adapted for any type of assembler, or source code, or other computer languages and syntax which provide a suitable obfuscation instruction.

By obfuscating code in different places throughout the program, it is much more difficult for a programmer to obtain useful information. The decompiler loses synchronization with the instructions and can display missing, or incorrect, instructions in place of the actual ones. With enough portions of the code obscured, a would-be hacker is required to trace through all the code, manually. The debugger (or disassembler) is expecting the code to return after a jump to a certain instruction, but the code changes the return location causing the debugger to break out of its gui. Two code examples are provided in Table I and Table II:

TABLE I

| | |
|---|---|
| call $+6 | ;Highly efficient! |
| DB 0EBh | |
| add dword ptr [esp], 6 | |
| ret | |

TABLE II

| | |
|---|---|
| call $+12 | ;Not efficient. |
| DB 083h | |
| jmp $+10 | |
| DB 08Bh | |
| Inc [esp] | |
| ret | |

A more advanced technique can involve randomly exchanging jump commands in the .ASM file with 'tricky returns.' This requires pushing the destination address instead of altering the esp register like previous examples. This way, this (intelligent) obfuscation macro would not be competing against other macros. By placing the 'tricky returns' where there is already a jump, the byte overhead is reduced.

The instruction "INT 35" has obfuscation properties. Unlike INT 20, no additional data is displayed. In fact, INT's 34-3A or so have the same ability to totally mask three bytes. As an example:

| actual code | the debugger window |
|---|---|
| 0 JMP 4 | 0 JMP 4 |
| 2 INT 35h | 2 INT 35h |
| 4 NOP | 7 XOR EAX, EAX |
| 5 NOP | |
| 6 NOP | |
| 7 XOR EAX, EAX | |

Of course, as much as this is helpful, three bytes of obfuscation is not all that impressive. In tandem with INT 20 though, it is an entirely other story. This example:

jmp $+2

INT 35h jmp $+2

INT 20h yielded 14 bytes of obfuscation. Much better! But, then there is this fine example:

jmp $+4

INT 35h

INT 20h only six bytes long, but yielded an incredible 17 bytes of obfuscation over five instructions. Each instruction remains obfuscated until executed and returns to an obfuscated state afterwards.

Below is some gibberish code that does a fake comparison, then it jumps into the second byte of the compare, which, along with the first byte of the add instruction, cause the program to jump to the byte after the DB. The purpose of this snippet is to confuse the cracker, and in the process obfuscate six bytes. Although unlikely, to avoid collision problems, the me instruction should be switched to jmp.

| | |
|---|---|
| 3B EB | cmp ebp, ebx |
| 04 00 | add al, 0h |
| 75 FB | jne $–5 |
| 83 | DB 083h |

The object of these are only to obfuscate code. They are classified as 'petty obfuscators' because it would be more suitable to reuse a 'great obfuscator.'

```
To obfuscate four bytes:

jmp $+4            ;Note: this may need byteswapping
DD 0660FBCA3h      ,BSF SP [REG+4bytes]
To obfuscate five bytes:

jmp $+4
DD 0660FBAA3h      ;BT WORD PTR [REG+4bytes], 1 byte
To obfuscate six bytes:

jmp $+4
DD 0660FBAA4h      ;BT WORD PTR [REG*4+REG+4bytes], 1byte
```

Although the present invention has been discussed with respect to specific embodiments, these embodiments are merely illustrative, and not restrictive, of the invention. The scope of the invention is to be determined solely by the appended claims.

What is claimed is:

1. A method for obfuscating computer program instructions upon disassembly, the method comprising:
   inserting an obfuscating instruction for causing a disassembler to not disassemble one or more bytes subsequent to the obfuscating instruction, wherein said obfuscating instruction is an INT instruction; and
   inserting a branch instruction to invoke execution of one or more bytes subsequent to the obfuscating instruction, said method including the step of inserting the following code:
   JMP $+4
   INT 35h.

* * * * *